(12) United States Patent
Wippermann et al.

(10) Patent No.: US 12,380,665 B2
(45) Date of Patent: Aug. 5, 2025

(54) DEVICE AND METHOD OF CAPTURING A PROJECTED DOT PATTERN IN A DISPLAY DEVICE

(71) Applicant: Fraunhofer-Gesellschaft zur Förderung der angewandten Forschung e.V., Munich (DE)

(72) Inventors: Frank Wippermann, Jena (DE); Jacques Duparré, Jena (DE); Andreas Tünnermann, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 440 days.

(21) Appl. No.: 18/062,648

(22) Filed: Dec. 7, 2022

(65) Prior Publication Data

US 2023/0094595 A1 Mar. 30, 2023

Related U.S. Application Data

(63) Continuation of application No. PCT/EP2021/065382, filed on Jun. 9, 2021.

(30) Foreign Application Priority Data

Jun. 10, 2020 (DE) .......................... 102020207302.3

(51) Int. Cl.
*G06V 10/145* (2022.01)
*G06V 10/147* (2022.01)
(Continued)

(52) U.S. Cl.
CPC .......... *G06V 10/145* (2022.01); *G06V 10/147* (2022.01); *G06V 10/60* (2022.01); *G06V 40/166* (2022.01); *H04N 9/3161* (2013.01)

(58) Field of Classification Search
CPC .... G06V 10/82; G06V 10/774; G06V 10/806; G06V 10/58; G06V 10/764;
(Continued)

(56) References Cited

U.S. PATENT DOCUMENTS

| | | | |
|---|---|---|---|
| 7,897,903 B2 | 3/2011 | Duparre et al. | |
| 8,629,930 B2 | 1/2014 | Brueckner et al. | |

(Continued)

FOREIGN PATENT DOCUMENTS

| | | | | | |
|---|---|---|---|---|---|
| CN | 109616015 A | * | 4/2019 | ......... | G06K 9/00255 |
| CN | 109616015 B | * | 1/2021 | ......... | G06K 9/00255 |

(Continued)

OTHER PUBLICATIONS

European language office action dated Dec. 9, 2024, issued in application No. EP 21 732 836.8.

(Continued)

*Primary Examiner* — Michael P Stafira
(74) *Attorney, Agent, or Firm* — McClure, Qualey & Rodack, LLP

(57) ABSTRACT

A device includes a plurality of imaging optical channels inclined in relation to one another, each of which includes an optic and at least one detector pixel arrangement. The plurality of optical channels are configured to obtain an image of a dot pattern of a field of view by imaging said field of view. The optical channels pass through the display plane and are set up for imaging (projecting) the field of view between the display pixels. The device includes an evaluator that is coupled to detector pixels of the detector pixel arrangements and configured to evaluate the dot pattern on the basis of a comparison, which causes hyper resolution, of signal intensities of different detector pixels so as to obtain an evaluation result, and to control the device at least partly on the basis of the evaluation result.

20 Claims, 9 Drawing Sheets

(51) Int. Cl.
*G06V 10/60* (2022.01)
*G06V 40/16* (2022.01)
*H04N 9/31* (2006.01)

(58) Field of Classification Search
CPC .. G06V 40/174; G06V 10/145; G06V 10/147; G06V 10/26; G06V 10/44; G06V 10/60; G06V 20/194; G06V 40/166; G06V 10/761; G06V 10/24; G06V 10/40; G06V 10/42; G06V 10/454; G06V 10/143; G06V 10/462; G06V 10/80; G06V 10/803; G06V 40/161; G06V 10/20; G06V 10/25; G06V 10/56; G06V 10/765; G06V 10/7715; G06V 10/776; G06V 20/13; G06V 20/182; G06V 20/52; G06V 40/168; G06V 40/40
See application file for complete search history.

(56) References Cited

U.S. PATENT DOCUMENTS

| | | | |
|---|---|---|---|
| 9,454,261 B2 | 9/2016 | Duparre et al. | |
| 10,290,257 B1* | 5/2019 | Slobodin | H04N 23/54 |
| 10,708,570 B2 | 7/2020 | Wippermann et al. | |
| 10,771,668 B2 | 9/2020 | Wippermann et al. | |
| 10,785,422 B2* | 9/2020 | Ortiz Egea | G06T 7/521 |
| 11,294,422 B1* | 4/2022 | Srikanth | G06F 1/1626 |
| 2007/0109438 A1 | 5/2007 | Duparre et al. | |
| 2011/0134040 A1 | 6/2011 | Duparre et al. | |
| 2011/0228142 A1 | 9/2011 | Brueckner et al. | |
| 2015/0198716 A1 | 7/2015 | Romano et al. | |
| 2019/0012512 A1 | 1/2019 | He et al. | |
| 2019/0204782 A1 | 7/2019 | Lee | |
| 2019/0266939 A1* | 8/2019 | Slobodin | G09G 3/3208 |
| 2020/0288070 A1* | 9/2020 | Siala | G02F 1/13338 |

FOREIGN PATENT DOCUMENTS

| | | | | |
|---|---|---|---|---|
| DE | 10 2009 049 387 A1 | 4/2011 | | |
| DE | 102012014330 A1 * | 1/2014 | ......... | G01B 11/2513 |
| DE | 20 2018 000 408 U1 | 5/2018 | | |
| EP | 1 979 769 B1 | 9/2011 | | |
| EP | 2 185 994 B1 | 1/2020 | | |
| JP | 4874657 A | 8/2007 | | |
| JP | 2015-114343 A | 6/2015 | | |
| TW | 201802541 A1 | 1/2018 | | |
| TW | I612337 | 1/2018 | | |
| TW | I612337 B | 1/2018 | | |
| WO | 2011/045324 A2 | 4/2011 | | |

OTHER PUBLICATIONS

International Search Report and Written Opinion issued in application No. PCT/EP2021/065382.

* cited by examiner

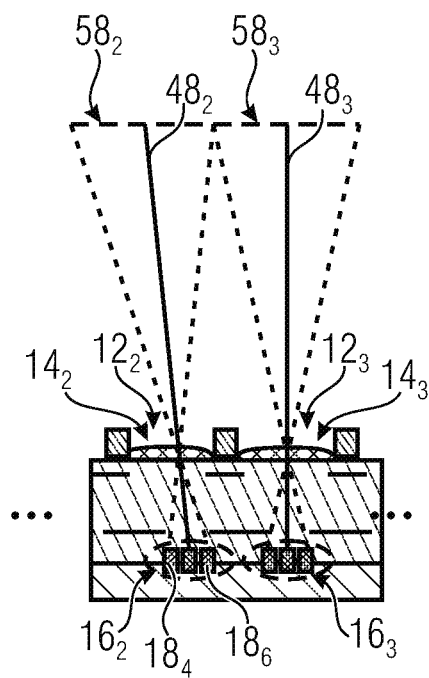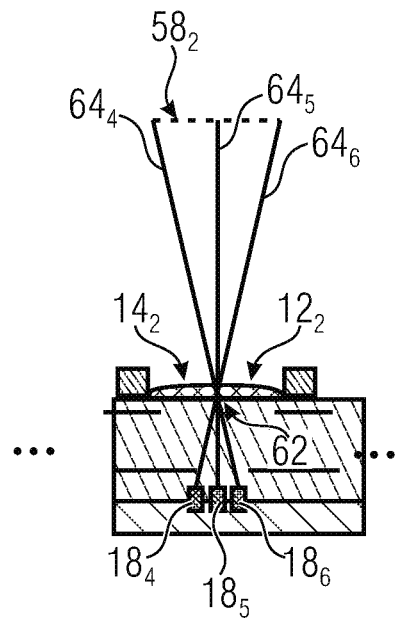
Fig. 3a
Fig. 3b
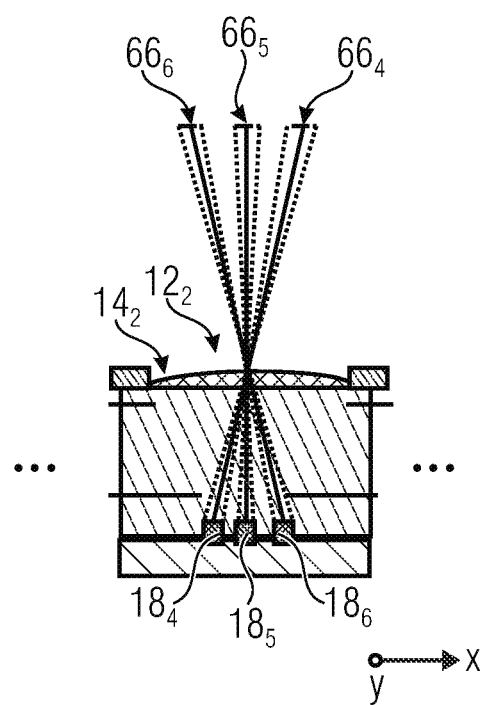
Fig. 3c

DEVICE AND METHOD OF CAPTURING A PROJECTED DOT PATTERN IN A DISPLAY DEVICE

CROSS-REFERENCE TO RELATED APPLICATIONS

This application is a continuation of copending International Application No. PCT/EP2021/065382, filed Jun. 9, 2021, which is incorporated herein by reference in its entirety, and additionally claims priority from German Application Nos 102020207302.3, filed Jun. 10, 2020, which is also incorporated herein by reference in its entirety.

The present invention relates to a device and to a method of capturing a projected dot pattern, in particular in combination with a display means for reproducing graphic information. Devices for capturing a projected dot pattern may be used, for example, in means for depth-map production and facial recognition associated therewith.

BACKGROUND OF THE INVENTION

Known technologies for depth-map determining for reliable facial detection within the consumer area which have established themselves, for example, under the term of face ID or face recognition, rely, in addition to the time-of-flight (ToF) method, for example, on the methods of structured illumination or active stereo. To this end, typically in the NIR-wavelength range, a non-regular dot pattern is projected toward the face, and by means of one or two imaging devices, the dot pattern projected onto the scene (face) is re-captured. The shape/deformation/distance between individual components of the scene influences the locations of the individual light dots in/on the former, and a specific distortion of the captured dot pattern arises. Said information may be used for reconstructing the depth map/shape of the object/scene observed.

There is a need for compact means for capturing a projected dot pattern in combination with a display device and corresponding methods.

SUMMARY

According to an embodiment, a device may have: a plurality of imaging optical channels inclined in relation to one another, each of which includes an optic and at least one detector pixel arrangement; the plurality of optical channels being configured to obtain an image of a dot pattern of a field of view by imaging said field of view; display means comprising a multitude of display pixels arranged within a display plane, the display pixels being configured to display graphic information; wherein the optical channels pass through the display plane and are set up for imaging the field of view between the display pixels; evaluation means coupled to detector pixels of the detector pixel arrangements and configured to evaluate the dot pattern on the basis of a comparison, which causes hyper resolution, of signal intensities of different detector pixels so as to obtain an evaluation result, and to control the device at least partly on the basis of the evaluation result.

According to another embodiment, a method of providing a device may have the steps of: providing a plurality of imaging optical channels inclined in relation to one another, each of which includes an optic and at least one detector pixel arrangement; so that the plurality of optical channels is configured to obtain an image of a dot pattern of a field of view by imaging said field of view; providing display means comprising a multitude of display pixels arranged within a display plane, so that the display pixels are configured to display graphic information; so that the optical channels pass through the display plane and are set up for imaging the field of view between the display pixels; coupling evaluation means to detector pixels of the detector pixel arrangements and configuring the evaluation means such that same is set up to evaluate the dot pattern on the basis of a comparison, which causes hyper resolution, of signal intensities of different detector pixels so as to obtain an evaluation result, and to control the device at least partly on the basis of the evaluation result.

A core idea of the present invention consists in having found that detector pixel arrangements for sensing a field of view and/or for obtaining an image of a dot pattern of the field of view may be combined with a display means such that the detector pixel arrangements are headed in the same direction, which is also illuminated by the display means for depicting graphic information. Thus, the detector pixels may look past, e.g., display pixels of the display device. This enables integrating an arrangement of a device for capturing a projected dot pattern with a device for displaying graphic information, so that the functions of a device for capturing a projected dot pattern that have been enabled may also be employed in corresponding display devices, such as within the consumer area, and so that very compact devices may be obtained. It is the goal of the invention to combine/integrate compact devices for capturing a projected dot pattern with a display means for graphic information.

In accordance with an embodiment, a device includes a plurality of imaging optical channels inclined in relation to one another, each of which includes an optic and at least one detector pixel arrangement. The plurality of optical channels are configured to obtain an image of a dot pattern of a field of view by imaging said field of view. A display means of the device comprises a multitude of display pixels arranged within a display plane, the display pixels being configured to display graphic information. The optical channels pass through the display plane and are set up for imaging (projecting) the field of view between the display pixels. An evaluation means of the device is coupled to detector pixels of the detector pixel arrangements and configured to evaluate the dot pattern on the basis of a comparison, which causes hyper resolution, of signal intensities of different detector pixels so as to obtain an evaluation result, to control the device at least partly on the basis of the evaluation result. This enables integrating a display means with a detector pixel arrangement provided for sensing the projected dot pattern, so that compact devices can be obtained.

In accordance with an embodiment, the device includes a projector configured to emit a known dot pattern. This, in turn, enables capturing a dot pattern, which is distorted by the scene/the face, by the image capturing device. The projector and the image capturing device are tuned to each other in terms of their parameters so as to obtain an overall system having as small a length as possible.

In accordance with an embodiment, the projector is configured to emit the dot pattern with an infrared spectrum. The optical channels are adapted to the infrared spectrum and/or selectively sense the infrared spectrum, e.g., by employing corresponding filters or materials for the detector pixel arrangements. This enables projection and/or processing of the dot pattern outside a wavelength range visible to the human eye.

In accordance with an embodiment, the projector is configured to emit the dot pattern as a pattern that is non-periodic or pseudo-random at least in portions. This enables robust evaluation of the projected dot pattern while avoiding ambiguities.

In accordance with one embodiment, the projector is configured to emit the dot pattern with at least 5,000 dots. This enables a good lateral resolution of the depth map for the field of view.

In accordance with one embodiment, the projector and the arrangement of the optical channels are matched to each other such as to emit and capture the dot pattern, at a reference distance of the field of view from the device, such that each detector pixel senses, on average, at the most one dot of the dot pattern at a time. This enables a meaningful comparison of light intensities of adjacent detector pixels.

In accordance with one embodiment, the projector includes an array of surface emitters (VCSEL) and an optic including a diffractive element. This enables a compact design of the projector as well as optional arrangement of additional beam formers of the optics or lenses such as a Fresnel lens, for example.

In accordance with an embodiment, the evaluation means is configured to obtain the evaluation result on the basis of a comparison of the image to a reference pattern. This enables accurately determining deviations within the field of view and, thus, determining the depth map.

In accordance with one embodiment, the evaluation means is configured to perform the comparison of signal intensities of different detector pixels so as to determine positions of dots of the dot pattern that are more precise than would be achieved by sampling the total field of view by means of the detector pixels. Thus, an accurate depth map may be produced on the basis of precise positioning of the dots while neglecting areas between the individual dots.

In accordance with one embodiment, the evaluation means is configured to determine positions of dots in the image on the basis of an evaluation of a light intensity with which the same light dot is projected onto adjacent detector pixels and while taking into account a response function of the detector pixels. On the basis of the relative comparison of the light intensity, precise positioning of the light dots can thus be obtained, and on the basis of a comparatively small number of detector pixels and short focal lengths of the optics and, consequently, of a small installation space, an accurate result can be obtained.

In accordance with an embodiment, the evaluation means is configured to determine a distortion in the dot pattern and to produce a depth map of the field of view on the basis of the distortion, and to obtain the evaluation result on the basis of the depth map. On the basis of the distortion, therefore, a comparatively low-calculation depth map may be obtained, which is advantageous, in particular, for mobile devices where high-sampling or high-resolution optics and/or image sensors are to be dispensed with.

In accordance with an embodiment, the device is configured to determine, on the basis of the evaluation result, a usage authorization of a user located at least partly within the field of view, and to control the device in compliance with the usage authorization. This enables determining an access authorization in a manner that is convenient for a user, since inputting a password or PIN may be dispensed with, for example. An access authorization that has been positively evaluated entails activation of the display device, for example.

In accordance with an embodiment, micro lenses of the optics of the optical channels and the display pixels are arranged within a common plane area. This enables space-saving arrangement of the display device and the capturing device for the projected dot pattern in general, and specifically, this enables avoiding too large a length of the optical channels of the optics, on the one hand, and concealing the display pixels by optics, on the other hand.

In accordance with an embodiment, optics are arranged between adjacent display pixels. This enables a particularly small lateral expansion of the arrangement in total and also enables, for a fixed number of apertures of the optics, a particularly small installation height and/or length of optical channels.

In accordance with an embodiment, the optical channels are arranged in a first two-dimensional arrangement, and the display pixels are arranged in a second two-dimensional arrangement. This enables a planar configuration of the display pixels and the detector pixel arrangement. With an at least partial overlap of both the two two-dimensional arrangements, one may further obtain a high integration density.

In accordance with an embodiment, the evaluation means is set up for evaluating structured light or for active-stereo evaluation. This enables employing robust methods or algorithms for determining the depth map.

In accordance with an embodiment, at least one of the detector pixel arrangements comprises a plurality of detector pixels. Sensing areas of the plurality of detector pixels overlap to an extent of at least 50%. This enables accurate performance of the comparison of signal intensities of different, in particular adjacent, detector pixels as a response to the same captured light dot.

In accordance with an embodiment, the detector pixel arrangement is arranged within an image plane of the optics. This enables focused projection of the light dots onto the detector pixel arrangement.

In accordance with an embodiment, the evaluation means is configured to evaluate the field of view by means of a plurality of detector pixels per optical channel and, subsequently, with regard to several optical channels. This enables precise evaluation of a partial area, sensed by an optical channel, of the field of view by means of the plurality of detector pixels and a combination of the information on the basis of taking into account several optical channels for the total field of view.

In accordance with an embodiment, focal lengths of the optical channels amount to less than 1 mm. This enables a small installation size of the device.

In accordance with an embodiment, an optic including a lens or a stack of lenses is formed. This enables individual adaptation of the optic to the respective requirements placed upon the optical channel.

In accordance with an embodiment, micro lenses of different optical channels exhibit channel-specific optical properties. This enables adapting the optics to a channel-specific relative position of the optical channel in the device.

In accordance with one embodiment, on this note, the device is implemented such that the micro lenses are formed, in a channel-specific manner, such that in an inclined line of vision associated with the respective optical channel, focused projecting of the (partial) field of view onto the detector pixel arrangement is obtained, for which purpose, e.g., anamorphic lenses comprising a non-rotationally symmetric aspheric surface description or free forms are suitable. This enables particularly compact devices having few layers of lenses per optic.

In accordance with one embodiment, a device comprises at least one aperture structure arranged between the detector pixel arrangements and the optics plane so as to provide stray-light suppression of adjacent optical channels. This enables precise performing the comparisons with high accuracy and without being influenced by ghost images.

In accordance with one embodiment, the device comprises at least one stray-light suppressing structure arranged between adjacent detector pixel arrangements and between a plane thereof and the optics plane so as to provide stray-light suppression of adjacent optical channels. Said stray-light suppression, too, enables performing the comparison(s) with high accuracy, and further enables, in a synergetic manner, utilizing the stray-light suppressing structure as a spacer, for example when the optics of different optical channels are connected to one another by a shared substrate and when the stray-light suppressing structure is connected to the substrate. Also independently of this, the optics may be spaced apart via said stray-light suppressing structure which may be understood, e.g., as upright or inclined walls of optical channels. In contrast to the previously presented aperture layers, it is in this manner that an air space may be obtained between the detector pixels and the optics since stray-light suppression by means of an aperture structure provides for a corresponding fixture.

In accordance with an embodiment, the device is set up for facial recognition of a user, in particular, depth-map based facial recognition. This enables convenient operation of the device.

In accordance with an embodiment, the device is formed as a smart watch. The small length of the optical channels that is enabled in embodiments cooperates in a particularly synergetic manner with small devices having display functions, in particular displays in smart watches.

In accordance with an embodiment, a method of providing a device described herein is provided.

BRIEF DESCRIPTION OF THE DRAWINGS

Embodiments of the present invention will be detailed subsequently referring to the appended drawings, in which:

FIG. 3a shows a schematic sectional side view of a part of the device of FIG. 1 and/or FIG. 2;

FIG. 3b shows a schematic sectional side view of an optical channel of FIG. 3a for further illustration of the effects which arise;

FIG. 3c shows a more detailed representation of the optical channel of FIG. 3b, wherein a spatial expansion of the detector pixels is additionally taken into account;

DETAILED DESCRIPTION OF THE INVENTION

Figure 1:
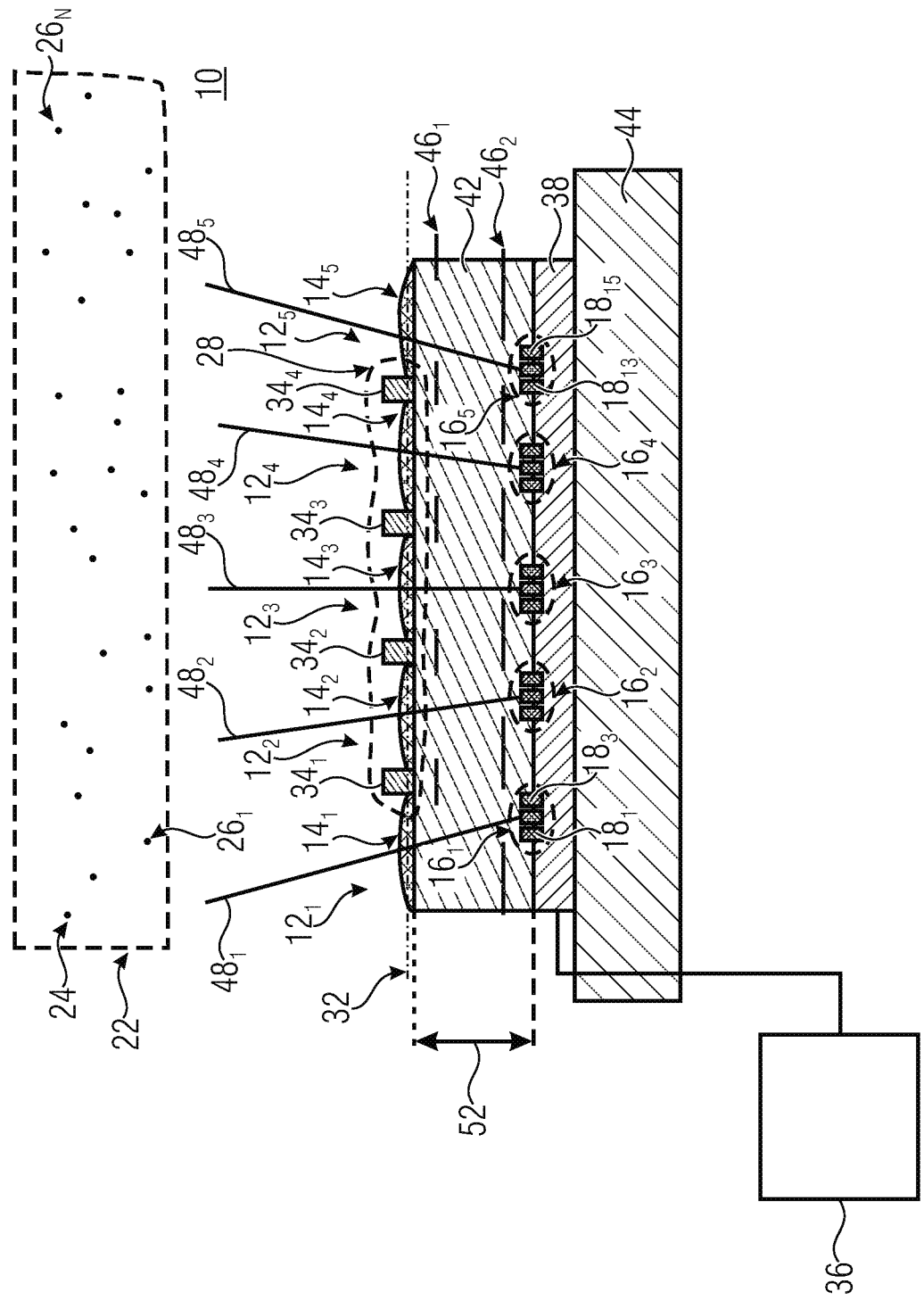
FIG. 1 shows a schematic sectional side view of a device in accordance with an embodiment.

Before embodiments of the present invention will be explained in more detail by means of the drawings, it shall be noted that elements, objects and/or structures which are identical, identical in function or identical in action have been provided with identical reference numerals in the various figures, so that the descriptions of said elements which are provided in different embodiments are interchangeable and/or mutually applicable.

Embodiments described below will be described in connection with a multitude of details. However, embodiments may also be implemented without said detailed features. Moreover, embodiments will be described while using block diagrams to substitute for detailed illustrations for the sake of comprehensibility. In addition, details and/or features of individual embodiments may be readily combined with one another as long as there is no explicit description to the contrary.

FIG. 1 shows a schematic sectional side view of a device 10 in accordance with an embodiment. The device 10 includes a plurality of optical channels $12_1$ to $12_5$, which are inclined in relation to one another. By way of example, five optical channels $12_1$ to $12_5$ are depicted; however, it is also possible to arrange any other, in particular larger, number of optical channels, e. g. at least 2, at least 4, at least 6, at least 9, at least 10, at least 20, or more. In the sectional side view of FIG. 1 that is depicted, the optical channels are shown in a one-dimensional array; however, embodiments also provide devices wherein the optical channels $12_1$ to $12_5$ are arranged in a two-dimensional arrangement, e. g. a rectangular or square arrangement.

Each optical channel comprises an optic $14_1$ to $14_5$ and at least one detector pixel arrangement $16_1$ to $16_5$. Additional elements such as filters or the like may also be provided. The optics $14_1$ to $14_5$ may also be configured to be identical to or different from one another and may be adapted, e. g., to the corresponding line of vision. Moreover, each of the optics $14_1$ to $14_5$ may comprise a lens, but also a stack of lenses, and/or additional optically effective elements.

The detector pixel arrangements $16_1$ to $16_5$ may comprise an identical or different numbers of detector pixels 18. Each detector pixel arrangement $16_i$, wherein i=1, . . . , 5, comprises at least one detector pixel $18_j$. In the depicted view of FIG. 1, the detector pixel arrangements $16i$ are shown to comprise three detector pixels each, the detector pixels being arranged next to one another in a row. As is described in connection with the arrangement of the optical channels, however, the detector pixel arrangements 16 may also comprise two-dimensional arrangements of detector pixels. The two-dimensional arrangements may be configured at random, for example to be rectangular or square, and may include, e. g., 2, 6, 8, or 9 or any other, in particular larger, number of detector pixels. The detector pixel arrangements 18 may be arranged in a respective, but advantageously within a shared, image plane of the optics 14. The image plane may be that plane, for example, wherein the field of view and, in particular, the light dots projected therein are imaged by the optics in a focused manner.

The optical channels $12_1$ to $12_5$ are configured to obtain or provide an image of a dot pattern 24 of the field of view 22 by imaging a field of view 22. The dot pattern 24 may comprise a distribution, for example dots $26_1$ to $26_N$ arranged in a pattern that is non-periodic or pseudo-random at least in portions. A number N of dots 26 of the dot pattern 24 in this context amounts to, e. g., at least 5,000, at least 7,000, or at least 10,000, e. g. in a 100×100 arrangement, for example.

The device 10 further includes a display means 28 comprising a multitude of display pixels $34_1$ to $34_4$ arranged within a display plane and configured to display graphic information. The display means 28 may implement a display or the like, which comprises a multitude of pixels, also of different colors. For example, the display pixels are pixels or picture elements which include organic light emitting diodes (OLED), consequently an OLED display. In their lateral expansions, the pixels may be implemented to be small as compared to an intermediate pitch, i. e. to a center-to-center distance.

The optical channels $12_1$ to $12_5$ pass through the display plane 32 and are set up for imaging (projecting) the field of view 22 between the display pixels $34_1$ to $34_4$, which means that the optical channels look past the display pixels 34. A number of display pixels $34_1$ to $34_4$ as well as an arrangement thereof may be arbitrary and may include, in particular, several 100×100, several 1,000×1,000 or more. Within this context, a 2D arrangement of the display pixels is square, for example; however, it is also possible to select a different geometry, i. e. rectangular or deviating therefrom. The number of pixels is also exemplary. The plane 32 is depicted, by way of example, as a plane that is parallel to a plane which has the detector pixel arrangements 16 arranged therein. The embodiments implemented do not exclusively relate to, or are not limited to, a non-curved plane, but enable also a curved plane 32 and, in particular, a plane area within a range of ±0.1 mm, ±0.8 mm or ±0.5 mm, or the like. If the display pixels 32 are placed, e. g., at locations of a vertex of the lenses of the optics $12_1$ to $12_5$, this shall also be understood to mean, in connection with the embodiments described herein, a placement within a shared plane area or within the display planes. If the optics $14_i$ are arranged between adjacent display pixels $34_j$, as is depicted in FIG. 1, this shall also be understood to mean an arrangement within a shared plane area.

The device includes an evaluation means 36 coupled to the detector pixels 18 and configured to evaluate the dot pattern and/or the image of the dot pattern 24 on the basis of a comparison, effecting hyper resolution, of signal intensities of different detector pixels 18 so as to obtain an evaluation result. The evaluation means 36 is configured to control the device 10 at least partly on the basis of the evaluation result. For example, the evaluation means 36 may be electrically and/or optically coupled to a circuit arranged at, on or within a detector pixel substrate 38 which fully or partly supports or carries the detector pixel arrangements $16_1$ to $16_5$.

The detector pixel substrate 38 and the optics $14_1$ to $14_5$ and/or the display plane 32 may have a transparent material 42 arranged therebetween which may serve, e. g., as a substrate for the display pixels 34 and/or as an optic carrier, or optic substrate. Alternatively or additionally, one or more of the display pixels 34 may be arranged or supported at an optic 14, for example in that the optic 14 is configured to be larger, in terms of surface area, than the display pixel and in that, therefore, the optic is concealed only partly by the display pixel. As the transparent material 42, a fluid such as a gas or a vacuum may alternatively be provided.

Optionally, a substrate 44 may be used for carrying or supporting the substrate 38, the transparent material 42, and/or further components.

Optionally, the device may comprise one or more aperture structures $46_1$ and/or $46_2$ that are arranged between the detector pixel arrangements $16_i$ and the plane of the optics 14, also referred to as an optics plane. It is also possible to arrange aperture structures such that the optics plane is arranged between the detector pixel arrangements 16 and one or more aperture structures 46; however, in this manner, the irradiation of the display pixels 34 might be impaired, which is to be taken into account in readouts. The aperture structures may be used for providing stray-light suppression of adjacent optical channels. Alternatively or additionally, light irradiation (emission) of the display pixels toward the detector pixel arrangements may be fully or partly shadowed. However, this may remain optional, in particular in that the detector pixels 18 are sensitive within a wavelength range different from a wavelength range emitted by the display pixels 34. The aperture structures $46_1$ and/or $46_2$ may also be implemented to provide a so-called "pinhole structure" for the detector pixel arrangements 16. This enables a selective field of view for the individual detector pixel arrangements. Lines of vision $48_1$ to $48_5$ of the optical channels $12_1$ to $12_5$ may be inclined in relation to one another such that the field of view 22 is opened up; it is advantageous, but not necessary, for the field of view 22 to be a contiguous field of view. However, the lines of vision $48_1$ to $48_5$ depicted by main beams may be designed such that, when the display pixels 34 are arranged in a course of the optical channels $12_1$ to $12_5$, it is possible to look past the display pixels 34, either in that the field angle is large enough so that the optical channel $12_1$ to $12_5$ is only partly shadowed by the display pixel 34, and/or in that the display pixel 34 is arranged apart from the optical channel.

In embodiments, focal lengths of the optical channels $12_1$ to $12_5$ amount to less than 1 mm, less than 0.8 mm or less than 0.6 mm, which enables correspondingly short distances 52 between the detector pixel arrangements 16 and the optics 14. This may result in a small installation height of the device 10, e. g. when the distance 52 is arranged to be parallel to a thickness direction or installation-height direction.

Optics 14 of different optical channels 12 or individual micro lenses therefrom may comprise channel-specific optical properties, e. g. with regard to an existing or omitted symmetry, a geometry or other properties. The micro lenses may be formed such that focused imaging of the field of view 22 is obtained in an inclined line of vision associated with the optical channel. On the basis of the inclined lines of vision 48, what comes into question for this are, e. g., anamorphic lenses comprising non-rotationally symmetrical aspheric surface descriptions and/or free forms, in particular for outer lenses. By means of the channel-wise adaptation of the optics to their respective lines of vision, so-called off-axis aberrations, in particular curvature of field and astigmatism, but also coma and distortion, may be minimized. For example, if a point-symmetric array, e. g. a 3×3 array or a 5×5 array is arranged, a central channel may quite readily exhibit a rotationally symmetric lens in one or more directions.

By way of example, the distance 52 is drawn in on a side of the optics 14 that faces the detector pixel arrangements 16, which, however, is only exemplary. Unlike FIG. 1, where the optics $12_1$ to $12_5$ each include an individual lens, the optics $12_1$ to $12_5$ may also include a stack of lenses having several lenses stacked along a direction parallel to the distance 52.

Figure 2:
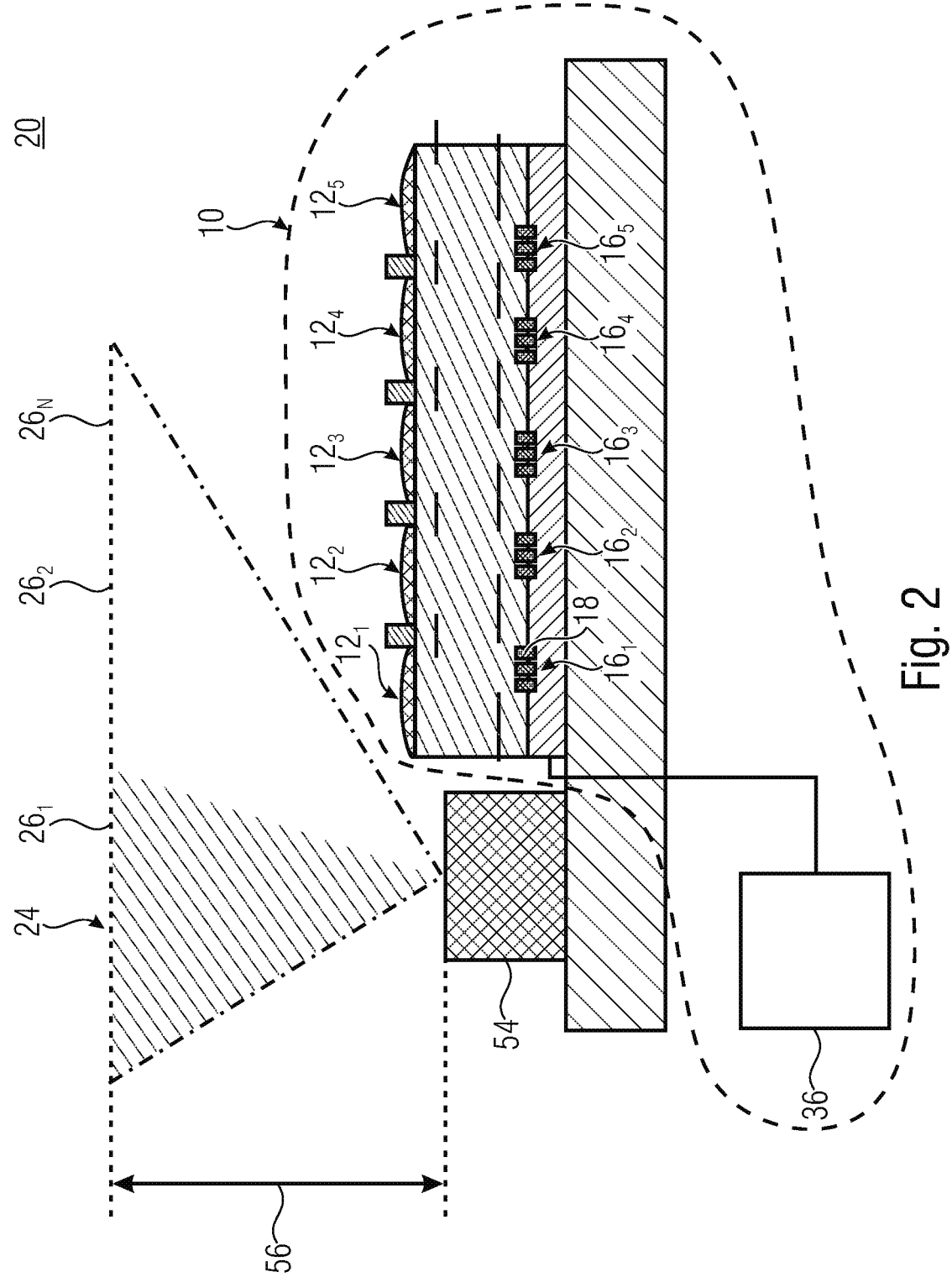
FIG. 2 shows a schematic sectional side view of a device in accordance with an embodiment which comprises a projector.

FIG. 2 shows a schematic sectional side view of a device 20 in accordance with an embodiment. The device 20 is based on and includes, e. g., the device 10 or an implementation thereof, and further comprises a projector 54 configured to emit the dot pattern 24. The projector may be configured, for example, to emit the dot pattern 24 including an infrared spectrum, which means a wavelength range which at least partly overlaps with an infrared wavelength range or comprises at least parts of the infrared wavelength spectrum. The optical channels $12_1$ to $12_4$ may be adapted, in terms of focusing and sensitivity, to the infrared spectrum, and/or may selectively sense the infrared spectrum. Thus, the detector pixel arrangements $16_1$ to $16_5$ may be set up, e. g., such that they are sensitive, due to their selection of material, to the emitted spectrum of the dot pattern 24. If the detector pixel arrangements 16 are also sensitive to additional, further wavelength ranges, the arrangement of filter structures may be provided for at least attenuating or even filtering out any wavelength ranges that are not needed or that are unintentional. Even if other wavelength ranges, which are not visible to the human eye, may be used—infrared spectra are advantageous in embodiments. What is particularly advantageous in this context is near infrared light comprising wavelength ranges of at least 780 nm and at the most 3 µm, or parts thereof. In particular, the wavelengths 850 nm and/or 940 nm are of interest since in this case, established emitters at hand.

The projector 54 and the arrangement of the optical channels $12_1$ to $12_5$ may be tuned to each other such that at a reference distance 56 of the field of view to the device 20, the dot pattern 24 is emitted by the projector 54 and captured and/or sensed by the optical channels $12_1$ to $12_5$ in such a manner that on average, each detector pixel 18 senses at the most one single dot 26 of the dot pattern 24 at a time. This may include setting the divergence of individual dots of the dot pattern and their mutual distances and/or setting sampling of the field of view by detector pixels and optical channels and/or the size of the response functions of individual detector pixels. This considerably simplifies evaluation by the evaluation means 36 since a maximum amplitude of a detector pixel 18 is triggered by one single dot 26, so that the comparison performed by the evaluation means 36 may be executed under the framework condition relating to the extent to which said single point 26 introduces light power onto the detector pixel 18.

The projector 54 may be configured to emit the dot pattern as a pattern that is non-periodic or pseudo-random at least in portions, wherein the pattern is non-periodic or pseudo-random may be selected to be large enough so that repetitions in the pattern occur only in optical channels that are spaced far apart from one another, which may simplify evaluation by the evaluation means 36. It is also possible for the entire dot pattern 24 to be configured to be non-periodic or pseudo-random. The evaluation means may be set up for evaluating structured light and/or for active-stereo evaluation.

The projector 54 may be configured to include an array of surface emitters (VCSEL) and an optic. The optic may include a diffractive element and may optionally comprise further beam-forming optics and/or lenses.

For example, the reference distance 56 may be a distance used as a basis for calibration and being a distance, for example, which at least within tolerance ranges corresponds to an expected object distance. Just like the device 10, the device 20 may provide, e.g., at least part of a display device, the access authorization of which is verified by means of the evaluation means 36. Examples hereof are, e. g., electronic door locks comprising facial recognition, mobile phones comprising facial recognition, and/or smart watches comprising facial recognition. Said devices may be tuned to a distance range within which the face of the user is expected. The reference distance 56 may be located within said range; any other implementations are also possible.

In other words, smart watches typically exhibit an OLED display. Here, the (different-colored) light emitters (display pixels) are located at a distance of just under 100 µm from one another. Smart watches are to be compact, in particular thin, despite having a powerful battery. Smart watches are to be able to be unlocked only by specific persons and may be restricted in usage, for which purpose methods of face ID, or face recognition, are suited. Likewise, NIR dot array emitters, e. g. the projector 54, and corresponding imaging devices, i. e. including optic $14_i$, the transparent substrate 42, and the detector pixel arrangement $16_1$ to $16_5$, are to be as compact as possible. Embodiments implement the idea of an "imaging device under the OLED display", or of placing the OLED display directly above, or on, the imaging device, and/or of intensely integrating or folding the OLED display of the smart watch and the imaging means with each other. For this purpose, the array optic 14 may be provided as an imaging means since a planar arrangement of the OLED display pixels may be arranged within the intermediate areas of the individual imaging channels, or possibly even directly on the individual lenses. Even an array imaging optic involves a very large installation length and also a very large lateral expansion if its resolution and sampling are to be at a maximum, so as to capture a dot pattern that is sufficiently dense for depth-map determination, and to resolve it in the classical sense, i. e. in accordance with known resolution criteria such as Rayleigh, Sparrow, Abbe or the like, which are based on separating the captured projected light dots on adjacent detector pixels from one another.

In contrast, embodiments are designed to implement a very small installation length of the optical channels 12 and, therefore, of the entire camera module on the basis of the model of compound eyes and/or multi-aperture imaging devices and while using micro lens arrays having small to medium resolutions. Such structures may be produced at a wafer scale and may be reminiscent, in their form of appearance, of a (computer) chip rather than of a classical objective. On the one hand, therefore, they can be produced at low cost and are predestined, by their planar, integrated design, for being installed into compact mobile terminals. The main goal of such arrangements of the multi-aperture imaging devices has so far been to produce conventional images whose resolution capacities have achieved the needed imaging task. Embodiments relate to comparing light intensities while being aware of the so-called response functions of detector pixels, as will be explained below in detail.

Embodiments relate to an evaluation means 36 which, on the basis of the determination and the phenomenon of hyper acuity, or hyper resolution, which means highly precise positioning of dot sources separated from one another by comparing the responses in adjacent detector pixels which sense said dot sources at the same time, as well as integrating/weaving/folding the channels of the imaging system with the pixels of a display and/or image reproduction device. Moreover, embodiments enable the addition that the entire specific architecture, i. e. the explicit projection of a non-equidistant pattern of light dots sufficiently separated from one another (e. g. in the near infrared, also referred to as "NIR"), capturing of said dot pattern by means of a corresponding array optic, which further is configured to be directly interwoven/integrated with the pixels of a planar display (which may be referred to as a "camera behind OLED" or "OLED on camera") is also enabled. This occurs, in particular, with the aid of the methodology of hyper acuity for efficiently adapting the array imaging system to its imaging task, so as to reduce the number of detector pixels and optical channels, but also, in particular, the installation length of the optic to a small value, possibly even to a minimum, so that they may be integrated, e. g., in compactness-driven applications, e. g. mobile terminals, in particular smart watches, which may be provided with the feature of depth-map based facial recognition, e. g. by means of structured light or active stereo. This means that devices described herein may be set up for facial recognition of a user, in particular depth-map based facial recognition.

The array imaging device may be configured, for example, with several pixels per imaging channel/lens, as depicted in FIG. 1 and FIG. 2. However, as compared to said form of implementation it is alternatively also possible to provide only one detector pixel per channel/lens, which will result in a clearly larger lateral expansion, however.

The individual lenses or groups of lenses and/or stacks of lenses per optical channel may differ from channel to channel in terms of their properties so as to be optimally corrected for or adapted to the respective main line of vision. The optical axes of the channels are inclined differently in relation to one another so as to sample the entire field of view in their totality. This is a further advantage of this arrangement: since the field of view is split up into many optical channels, there is no need for one optic to be optimized for the entire field of view, which would increase its complexity, but each channel needs only be able to process a clearly limited field of view of a few degrees. An opto-mechanical implementation of the array imaging means may be manifold. For example, what is at hand here may be a so-called monolithic architecture, i. e. the optics are connected to the detector pixels without any air gaps, but via transparent material ("substrate"), also with intermediate aperture planes or channel-insulating walls. Alternatively, the optics may be arranged on a substrate and may possibly be arranged upside down in relation to the detector pixel arrangement and be connected to the latter via a grid-like spacer and/or carrier structure which includes optical/channel-insulating, possibly inclined walls which prevent crosstalk.

In embodiments, the devices are set up such that for capturing the dot pattern, wherein the dots are sufficiently small, i. e. exhibit, in terms of angles, an expansion (divergence) of approx. 0.1° to 0.3°, are spaced apart from one another by an average distance of 0.5° to 3°, and such that the classical resolution capacity of the camera may be below or even clearly below the needed accuracy of positioning of the light dots and, thus, the focal length and eventually the installation length may be considerably reduced if, for positioning, the responses of adjacent channels to the same light dot are compared to one another while use is made of the knowledge of the course of the response functions of the channels, and are evaluated. In yet other words, the accuracy of positioning the light sources is clearly above the actual resolution capacities of the optical channels of the imaging device. Highly precise positioning of the light dots projected in a scene may be used for depth-map reconstruction and may thus substitute, at least partly, for the resolution of a conventional image.

FIG. 3a shows a schematic sectional side view of a part of the device 10 and/or 20, for example a section including the optical channels $12_2$ and $12_3$, which comprise the main lines of vision $48_2$ and $48_3$. Each optical channel $12_2$ and/or $12_3$ may span a (partial) field of view $58_2$ and/or $58_3$, respectively, of its own. A size of the partial field of view $58_2$ and $58_3$ may be at least partly influenced by the size of the associated image sensor area, i. e. the size and/or arrangement of the detector pixels 18 in the detector pixel arrangements $16_2$ and/or $16_3$ as well as the focal lengths of the optics $14_2$ and/or $14_3$. The lines of vision $48_2$ and $48_3$ are slightly tilted between the channels of the device so as to span, all in all, the total field of view 22 of FIG. 1. This may be achieved, for example, by an offset between a center of the optic and a center of the associated pixel group/detector pixel arrangement and/or by means of a specific lens shape. The partial fields of view of the device, which may also be referred to as channel fields of view, may abut one another at the target object distance or may overlap one another to a small or even a large extent.

FIG. 3b shows a further schematic sectional side view of the optical channel $12_2$ of FIG. 3a for further illustrating the effects which arise. On the basis of the spatial distance of the detector pixels $18_4$, $18_5$, and $18_6$ and of the shared optic $14_2$, which thus may provide, e. g., a shared optic center 62, the detector pixels $18_4$, to $18_6$ may comprise lines of vision $64_4$, $64_5$, and $64_6$ which slightly differ from one another. In other words, each pixel within a channel looks toward a slightly different direction, the detector pixels $18_4$ to $18_6$ being able to span, all in all, the channel field of view $58_2$.

FIG. 3c shows a more detailed representation of the optical channel $12_2$ of FIG. 3b, wherein a spatial expansion of the detector pixels $18_4$, $18_5$, and $18_6$ is additionally taken into account. The spatial expansion, e.g. within an x/y plane perpendicular to the distance direction 52, may result in that each pixel $18_4$ to $18_6$ spans a pixel field of view $66_4$, $66_5$ and $66_6$ associated with it; diffraction effects of the optic $14_2$ are also to be taken into account for this purpose. Said pixel field of view $66_4$ to $66_6$ may describe or provide a response function of the respective pixel $18_4$, $18_5$, or $18_6$. The range of angles on the object side which is associated with a detector pixel as being signal-generating may be defined as a response function.

Unlike the depiction in FIG. 3c, the response functions typically overlap in a spatial manner and limit, with their respective sizes, the effective resolution capacity of the imaging device, even if sampling is much finer due to the fact that many pixels and channels are used. The sensing areas of the detector pixels may overlap to an extent of at least 50%, at least 70%, or at least 80%, in particular with regard to the detector pixels of a shared detector pixel arrangement.

Irrespective of any diffraction effects not depicted here, the response function may be reduced by reducing the pixel size (which is detrimental to sensitivity) or by increasing the focal length and, thus, the installation length (which is detrimental to compactness). Embodiments resolve this conflict by means of a comparison, which results in a hyper resolution, of signal intensities of different detector pixels and on the basis of the knowledge of the course of their response functions. Said comparison enables positioning even if the image is not completely discriminated (resolved) or sampled, so that the information needed for depth-map reconstruction may nevertheless be available.

Figure 4A:
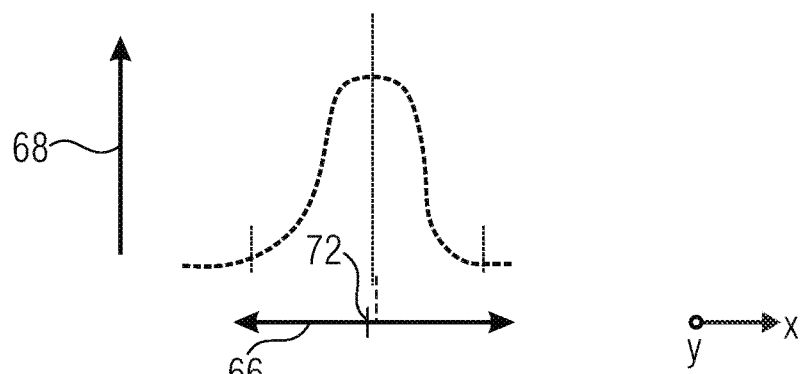
FIG. 4a shows a schematic sectional side view of a course (progress) of a response function in accordance with an embodiment along an x direction.

FIG. 4a shows a schematic sectional side view of a course of the response function along the x direction; it has to be noted here that the response function may also be determined in the y direction since the detector pixel and the dot response (point response) of the optic which results from diffraction effects and aberrations exhibit a two-dimensional areal extent. The detector pixel may comprise a variable signal amplitude or sensitivity 68 across the pixel field of view 66, which variable signal amplitude or sensitivity 68 comprises a maximum in an area of a maximum sensitivity 72, e.g. a mean range. Outside the field of view 66 to be evaluated, minor signal amplitudes 68 may possibly still be sensed, but they may be left out of consideration for the reflections undertaken here. The response function may thus provide, as a function of the distance of the light dot considered from the optical axis of the corresponding detector pixel, an amplitude value decreasing toward the margin while the brightness of the light dot considered remains the same, which may be taken into account in subsequent evaluations on the basis of the knowledge of the response function. The amplitude may represent an evaluation of a light intensity, i.e. an object of the same brightness will be evaluated differently at different locations of the detector pixel.

Figure 4B:
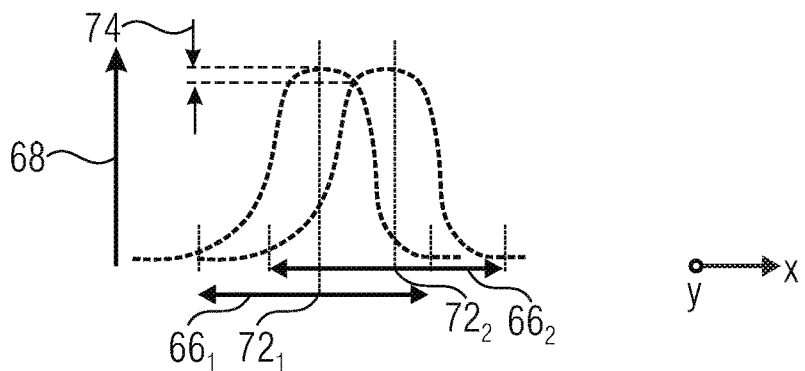
FIG. 4b shows a schematic representation of two response functions, wherein the respective area are located within a pixel field of view of the other detector pixel.

FIG. 4b. shows a schematic representation of two response functions $66_1$ and $66_2$, wherein the respective areas $72_1$ and/or $72_2$ are arranged within the pixel field of view $66_2$ and $66_1$, respectively, of the other detector pixel, which may result in that the response functions cannot be separated from one another in a classical sense or cannot be evaluated independently of one another for expanded objects considered. An amplitude decay 74 is too small for reliable differentiation and amounts, e.g., to only 10%, 15% or less than 20% of a maximum amplitude value.

Figure 4C:
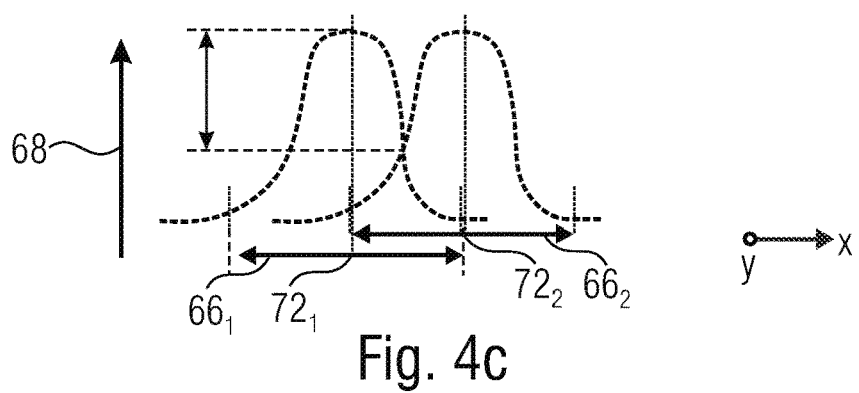
FIG. 4c shows a schematic representation of the response functions of FIG. 4b, which are arranged such that the resolution limit is just about adhered to, in accordance with an embodiment.

FIG. 4c shows a schematic representation of the response functions $66_1$ and $66_2$, which are arranged such that the classic resolution limit is just about adhered to, for example in that the areas $72_1$ and $72_2$ in each case are located precisely on the margin areas of the effective response functions $66_1$ and $66_2$.

Figure 4D:
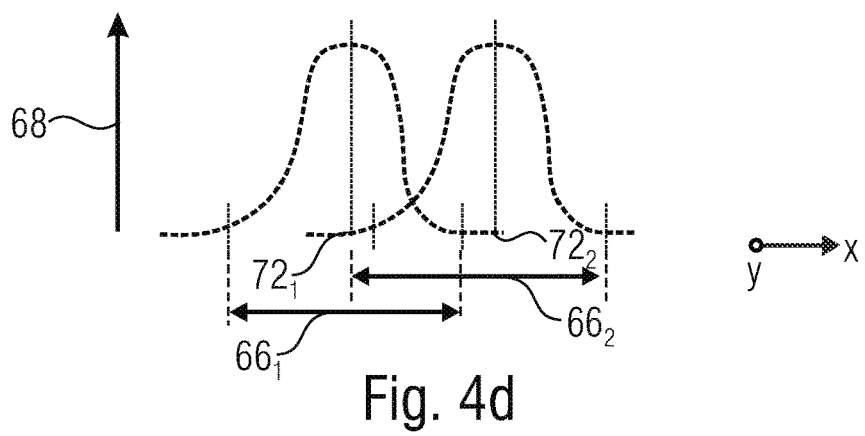
FIG. 4d shows a schematic representation of the response functions, wherein the response functions are separable.

FIG. 4d depicts a configuration wherein the response functions are separable in accordance with known resolution criteria such as a Abbe or Rayleigh. The areas $72_1$ and $72_2$ are located outside the respective other response function $66_1$ and $66_2$, respectively.

Figure 5:
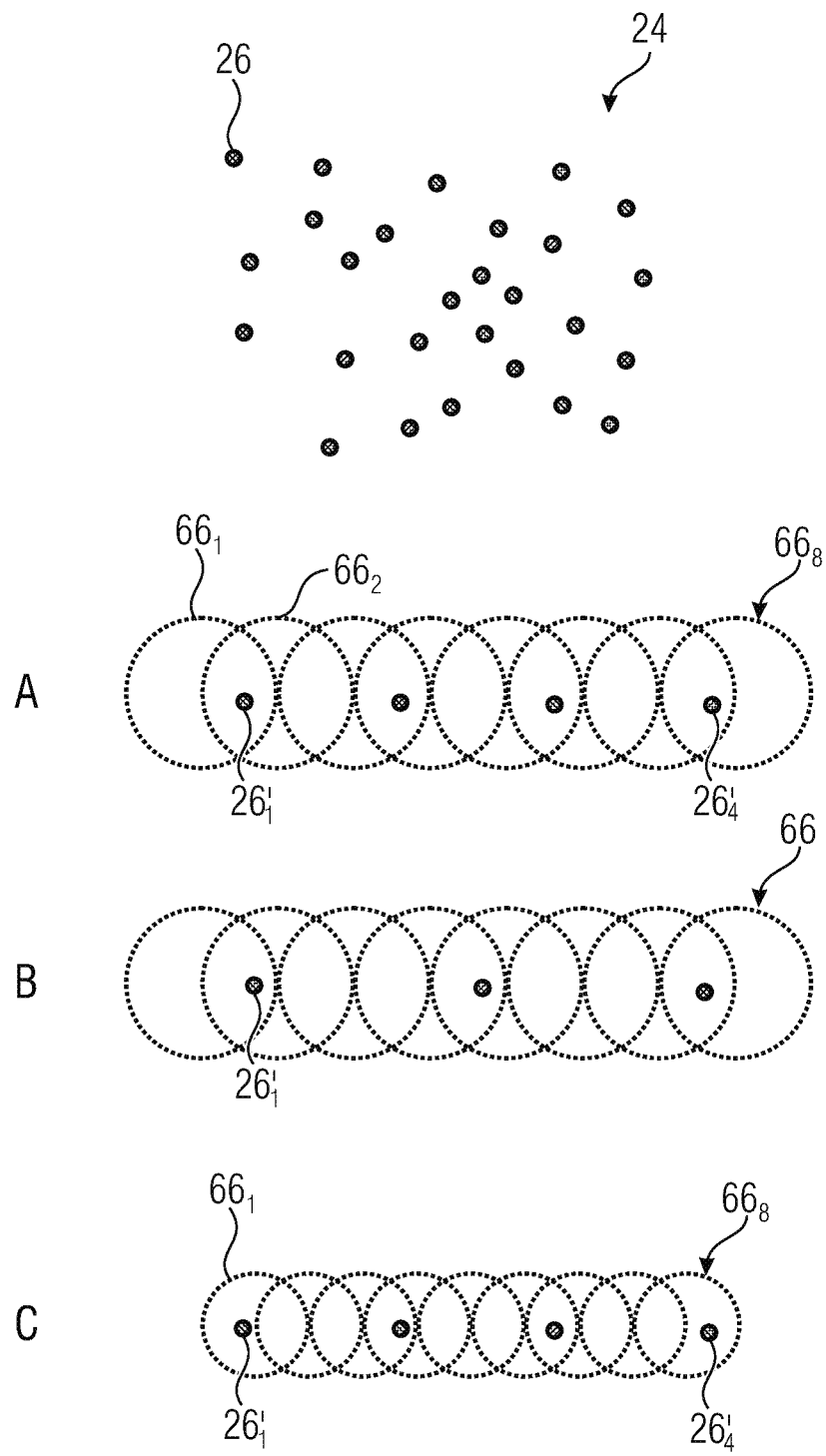
FIG. 5 shows a schematic representation of the focal-length problems arising with classical resolution.

FIG. 5 shows a schematic representation of the focal-length problem with classical resolution. The dot pattern 24 includes a multitude of dots 26 and is imaged by means of the optical channels, so that dots $26'_1$ to $26'_4$ imaged in one image are shown by way of example. An arrangement of light dots and/or focal-length variation is depicted in lines A, B, and C. To simplify the illustration, the light dots are shown in an equidistant manner in a 1D representation.

Line A shows classic sampling, wherein it is only with evaluation of the variation of the grey-scale value that the dot pattern and/or the image (picture) thereof cannot be discriminated and/or that no exact positioning of the locations of the light dots is possible since all of the adjacent detector pixels consistently address light dots dot $26'_1$-$26'_4$, which are located in a correspondingly dense manner in this constellation, e.g. the response functions $66_1$ and $66_2$ for the dot $26'_1$, which means that both pixels provide a correspondingly high grey-scale value. For example, the response functions $66_3$ and $66_4$ provide, on the basis of the light dot $26_2$, a signal etc., which is why, by way of example, no measurable modulation of the grey-scale value between the detector pixels may be determined, as a result of which, in turn, the positions of the light dots cannot be determined in a classical manner.

Line B depicts a lower dot density, i.e. the dot pattern 24 is adapted accordingly by a smaller density, which may resolve the contradiction of line A; however, on the one hand, the possible resolution of the depth map is already reduced per se by the reduced density of the dot pattern, and, on the other hand, highly precise positioning of the dots is still not possible since the dots might be located at slightly different positions for a same signal result. For example, the light dot $26_1$ in the response functions $66_1$ and $66_2$ (and/or the detector pixels associated therewith) triggers a signal in each case, the light dot $26_2$ in the response functions $66_4$ and $66_5$, while the response function $66_3$, e.g., provides no signal, i.e. the light dots $26_1$ and $26_2$ may be roughly separated from each other more or less to such an extent that high and low grey-scale values alternate. I.e., one may indicate that some coarse areas have light dots contained therein, while others do not. From this knowledge of the varying grey-scale values, it is still not possible, with low sampling, i.e., with sampling that may approximately correspond, in terms of its quantity, to the order of magnitude of the light dots to be captured, to determine the precise locations of the respective light dots within the pattern.

Line C depicts an increase in the focal length, by way of example, which entails an increase in the installation length, which enables, however, reducing a spatial expansion of the response functions $66_1$ to $66_8$, and which thus would enable resolution of the pattern of line A (by analogy with the approach in line B for dot patterns of lower densities: an intermediate detector pixel provides no signal) and would also enable arranging several pixels on the same surface area but would violate the requirement of the small installation length.

None of said variants enables compact devices wherein it is desired to sample the projected light pattern with a high density, the dot density of which results from an envisaged lateral resolution of the depth map and from the depth resolution and is usually high. To this end, the field of view is sampled with a multitude of response functions (of adjacent detector pixels and, subsequently, of detector pixels of adjacent optical channels). By way of example, the circles depicted correspond to resolution criteria, e.g., a $1/e^2$ length of the response function or zero of the AIRY function enlarged by a detector influence.

Embodiments comprise an evaluation means coupled to detector pixels of the detector pixel arrangements and configured to evaluate the dot pattern on the basis of a comparison, which causes hyper resolution, of signal intensities of different detector pixels and on the basis of the knowledge of the courses of the response functions so as to obtain an evaluation result. To this end, the detector pixels are arranged such that the sensing areas, the response functions, of the plurality of detector pixels overlap to an extent of at least 50%.

Figure 6A:
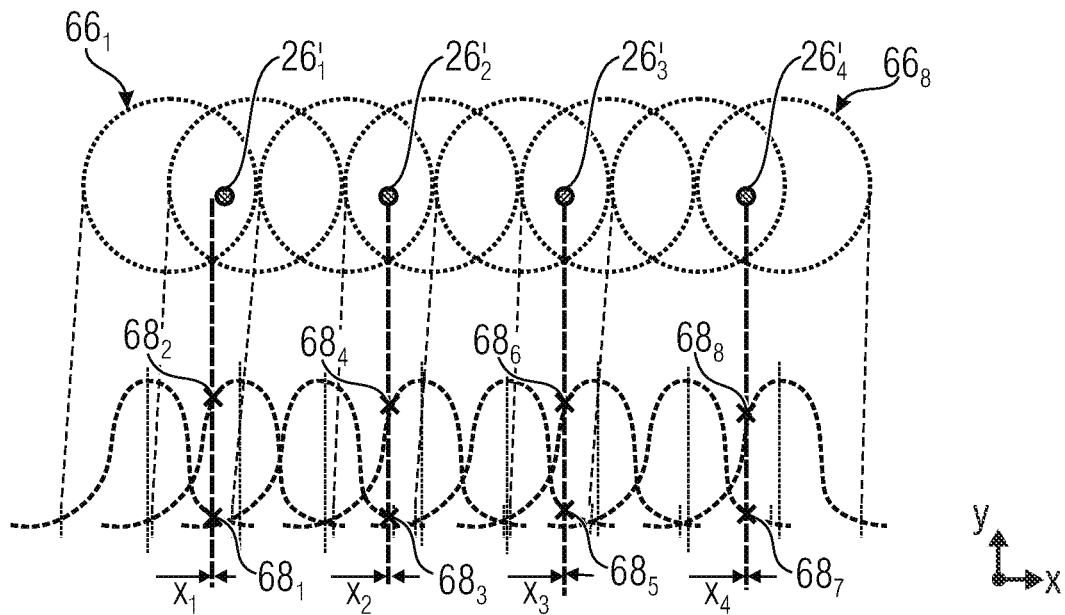
FIG. 6a shows such an exemplary configuration which may correspond, with regard to the response functions, to a configuration of FIG. 5, but which cannot be discriminated by means of classical methods, which however enables, in accordance with embodiments, precise positioning of the light dots of the dot pattern.

FIG. 6a shows an exemplary configuration of this kind which may correspond, with regard to the response function, to the configuration A of FIG. 5, which admittedly does not enable resolution of expanded objects by means of classic methods, but which enables precise positioning of separated light dots by means of the comparison described. Thus, the dots $26'_1$ to $26'_4$ may be sensed, in each case, by, e.g., 2 detector pixels, which may result, on account of the overlapping response functions $66_1$ to $66_8$, in respectively two amplitude values $68_1$ and $68_2$, $68_3$ and $68_4$, $68_5$ and $68_6$ as well as $68_7$ and $68_8$, in particular when it is assumed the each detector pixel senses only one dot. A relationship of the amplitude values 68 may thus result in a precise result regarding the positon of the light dot along the x direction while taking into account the response functions of the detector pixels, which previously were determined otherwise (in a calibration step), even if the image itself cannot be fully discriminated. Highly precise positioning of the positions $x_1$ to $x_4$ of the dots $26'_1$ to $26'_4$ in relation to the known centers of the response functions of the individual pixels and given the knowledge of their locations in the overall system, also in a global manner, is hereby enabled.

In the following, reference will be made in detail to details for determining and using response functions. A response function may be determined by sweeping a dot source through the field of view of an individual pixel while the course of the response (which means, the signal) is plotted as against an angle and as against a distance from the optical axis of the pixel. Said function may be used as being essential so as to determine, from the relative response of adjacent pixels to the same dot source, the relative position thereof in relation to the optical axes of the detector pixels in question, in particular since also the mutual relative positions of the detector pixels are known. For hyper acuity or hyper resolution, the overlap of the response functions is advantageous as long as they are not sufficiently large so that several light dots trigger a response in them at the same time. This may also be related to the setting of the sampling angle.

Figure 6B:
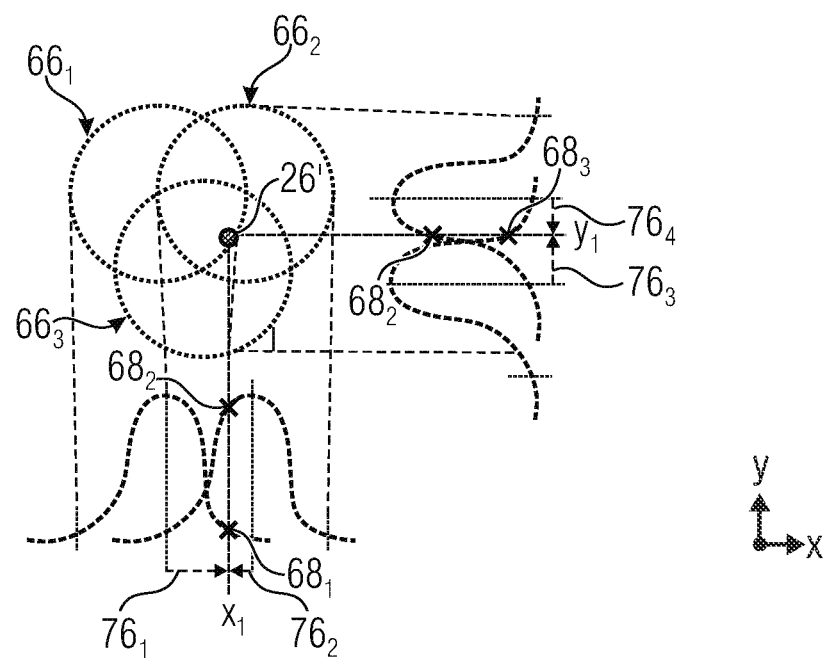
FIG. 6b shows a schematic representation of the concept of FIG. 6a comprising a two-dimensional arrangement of detector pixels in accordance with an embodiment.

FIG. 6b shows the concept of FIG. 6a in a two-dimensional part, which is closer to embodiments, having a two-dimensional arrangement of detector pixels. For example, the dot 26 is projected onto three detector pixels, so that a two-dimensional coordinate of the projected dot 26' may be determined from the three two-dimensionally distributed amplitude values $68_1$, $68_2$ and $68_3$ by forming pairs $68_1$ and $68_2$, and $68_2$ and $68_3$, respectively. The coordinate $x_1/y_1$ may be determined from distances $76_1$, $76_2$, $76_3$, and $76_4$, and/or from differences of the amplitude values $68_1$ to $68_4$ from maximum amplitudes. Sampling may be selected such that, statistically, not more than one light dot at a time falls into the response function of a pixel so as to avoid ambiguities.

In other words, embodiments are related to obtaining, on the basis of the knowledge of the presence of mutually separated projected light dots and on the basis of the knowledge of the exact course of the individual response functions of the pixels, precise positioning of the light dots that is obtained, in relation to the axes of adjacent pixels, by a specific comparison of the signals measured.

In other words, the concept described in connection with FIG. 6a also works in 2D, e. g. in x/y coordinates and also in sub-pixel accuracy. To this end, the system may be set, all in all, by an adapted design regarding the magnitudes of the response functions, their distances (sampling) and the densities of the projected light dots, such that (at least on a statistic average) not more than one light dot is located within the presented groups of three of response functions at any one time, since otherwise, inaccuracies and/or ambiguities may arise. Even though said ambiguities may occur, they may be resolved with a corresponding expenditure in terms of calculation. Said expenditure in terms of calculation may be saved by avoiding the ambiguities.

The evaluation means of a device described herein may be configured to obtain the determined positions of light dots across several optical channels so as to derive a pattern therefrom. Said pattern may be compared to a reference pattern by the evaluation means so as to determine a distortion in the pattern, wherefrom a depth map may be derived. While taking into account the geometry between the field of view, possibly the projector, and the arrangement of the optical channels, an unambiguous depth map can be produced. The comparison of signal intensities of different detector pixels may be performed by the evaluation means such that the positions of dots of the dot pattern may be determined which are more precise than sampling of the total field of view by means of the detector pixels, which herein is described as classical sampling or resolution (discrimination) of the image. Comparing signal values enables resolving the positions with sub-pixel accuracy. On the basis of an evaluation of a light intensity, of the signal amplitudes 68, of adjacent detector pixels while taking into account a response function of the detector pixels, positions of dots in the image may thus be determined.

Thus, the evaluation means may determine a distortion in the dot pattern and may produce a depth map of the field of view on the basis of the distortion. On the basis of the depth map, the evaluation result may be obtained. In simplified terms, the depth map may provide information about whether or not an authorized user is recognized. If the device is a smart watch, for example, it may be unlocked, or information associated with the user may be presented, in particular by the display device described herein, or a different mode of operation, which depends on the recognized user, may be set. In accordance with an embodiment, a usage authorization of a user who is at least partly located within the field of view may be determined on the basis of the evaluation result, and control may be performed by the evaluation means in line with the usage authorization.

The evaluation means may be configured to evaluate the field of view 22 with a plurality of detector pixels per optical channel and, subsequently, with regard to several optical channels. This means that the position of a light dot that has been established in the respective optical channel may be combined to form an overall pattern.

In other words, the magnitude of the angular response function (also referred to as a dot image response) of an imaging device may depend, on the one hand, on the diffraction limit (determined by the wavelength and the aperture and/or lens size) and, on the other hand, on the size of a detector pixel in relation to the focal length of the optic. For very short optics (focal length of a few 100 μm), the second aspect may play a comparatively major part; however, for classic miniature objects it is often neglected. For example, if about 10,000 very small light dots distributed across a typical diagonal field of view of 70° to 90° are to be discriminated/separated in a conventional manner and are to be imaged with detector pixels being approx. 3 μm to 5 μm in size, an array optic having an installation length of clearly more than 1 mm would also result, which might possibly prevent integration into mobile devices such as smart watches or the like.

However, since the nature of the pattern within which the positions of many light sources are to be determined with high precision is known, as is the fact that the light dots are sufficiently separated from one another that statistically, there will never be several light dots, at any one time, within the response area of a detector pixel when the design of the optic is adapted, but that one light dot may be located within the response area of several adjacent detector pixels at the same time, it is not necessary to discriminate the dot pattern in accordance with Rayleigh, Sparrow and/or Abbe criteria, for which purpose, in turn, the response functions would have to be clearly closer and, therefore, the focal length, and consequently, the installation length would have to be clearly larger than would be useful for the envisaged application. Instead, the embodiments make use of heavily overlapping response functions, while the number of response functions which sample the field of view is selected to be large enough to ensure that there will never be several light dots (at least on a statistic average) in a response function at the same time, and the relative signals of adjacent response functions on the same light dot are used for determining the precise position of this light dot and, in the same manner, of all the other light dots of the projection within the field of view with high precision.

A substrate having lenses or several layers of apertures located thereon so as to prevent crosstalk between the channels may be equally provided as may be walls for optical channel insulation, which are at least partly opaque and possibly inclined.

Figure 7:
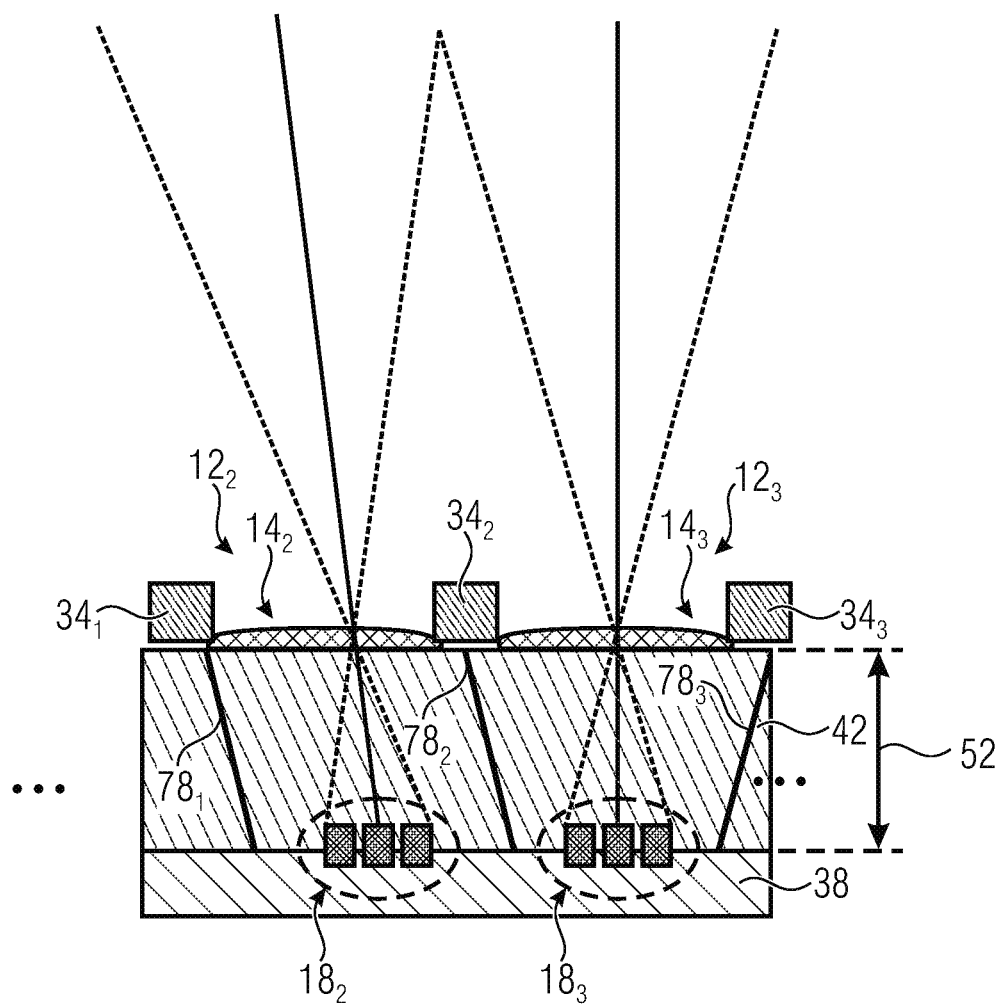
FIG. 7 shows a schematic sectional side view of a part of a device in accordance with an embodiment, which comprises stray-light suppressing structures between optical channels.

FIG. 7 shows a schematic sectional side view of a part of a device 70 that is modified, as compared to the device 10 or 20, such that as an alternative to the apertures $46_1$ and $46_2$, which are optional in the devices 10 and 20, stray-light suppressing structures $78_1$, $78_2$, and $78_3$ may be arranged which are arranged between adjacent detector pixel arrangements $18_2$ to $18_3$ and/or further detector pixel arrangements in each case. Even though the stray-light suppressing structures $78_1$, $78_2$, and $78_3$ are depicted to have the same thickness and to be inclined in relation to a main substrate side, which enables adaptation to an optical path of the optical channels, it is also possible, alternatively, to provide for a variable thickness and/or a perpendicular arrangement toward the main substrate side without necessarily giving up said advantage.

In the representation of FIG. 7, the transparent material 42 is arranged between the display pixels 34 and the detector pixel substrate 38. In some embodiments, the distance 52 may be set, fully or in part, by the stray-light suppressing structures $78_1$, $78_2$, and/or $78_3$, which means that the transparent material 42 may also be a non-solid, e. g. liquid or gaseous, material such as air. The stray-light suppressing structures $78_1$, $78_2$, and $78_3$ may be individual structures, but may also provide a shared and mutually connected structure which in a top view is reminiscent of a grid structure. For example, provision may be made for the optics 14 of different optical channels to be connected to one another via a shared substrate and for the stray-light suppressing structure to be connected to said substrate and, e. g., to the detector pixel substrate 38. Alternatively, the optics may also be placed individually into gaps between stray-light suppressing structures and thus be fixed. In this case, too, an air space between lenses and an image sensor may be obtained. For example, the transparent material 42 may be configured to be comparatively thin and may be spaced apart from the substrate 38 by the stray-light suppressing structures.

In one exemplary embodiment, the projection pattern exhibits, e. g., 10,000 dots, which in a simplified manner may be presented in a pattern of 100×100 across the field of view (FOV), which results in a one-dimensional representation in 100 dots. It shall be noted here that despite the regular representation of the pattern, such a pattern is typically irregular. In a classic imaging approach of conventional cameras or even conventional array cameras, which are different from embodiments described herein, one will proceed such that in order to ascertain displaced positions of the above-described dots within the FOV with sufficient accuracy, an approx. 1 megapixel image sensor, i. e. 1,000×1,000 pixels, in the case of 1D 1,000 pixels, are used so as to obtain roughly a ratio of 10 pixels/dot in order to obtain sufficiently accurate positioning or resolution.

Figure 8:
FIG. 8 shows a schematic, one-dimensional representation of projected light dots and of the needed high sampling performed by detector pixels to achieve sufficiently precise positioning of the light dots within the field of view, in a classical approach.

This results in the comparison, depicted in FIG. 8, of the pixel density across the field of view (non-hatched) with the projected dot density across the field of view (hatched). Even though there is only a small dot density, the pixel density is to be clearly higher in order to achieve the needed accuracy of positioning of the dots projected onto a surface (in the example, about 10 times more), since by means of said method one establishes, for example, whether a dot is discretely present on this or that pixel. So as to achieve, in turn, the resolution of the optic detector arrangement that is needed for this sampling step, the system becomes very long, and a large number of channels is provided since each pixel may or can or is to have associated therewith only a very narrow response function in order to obtain the needed precision.

Figure 9:
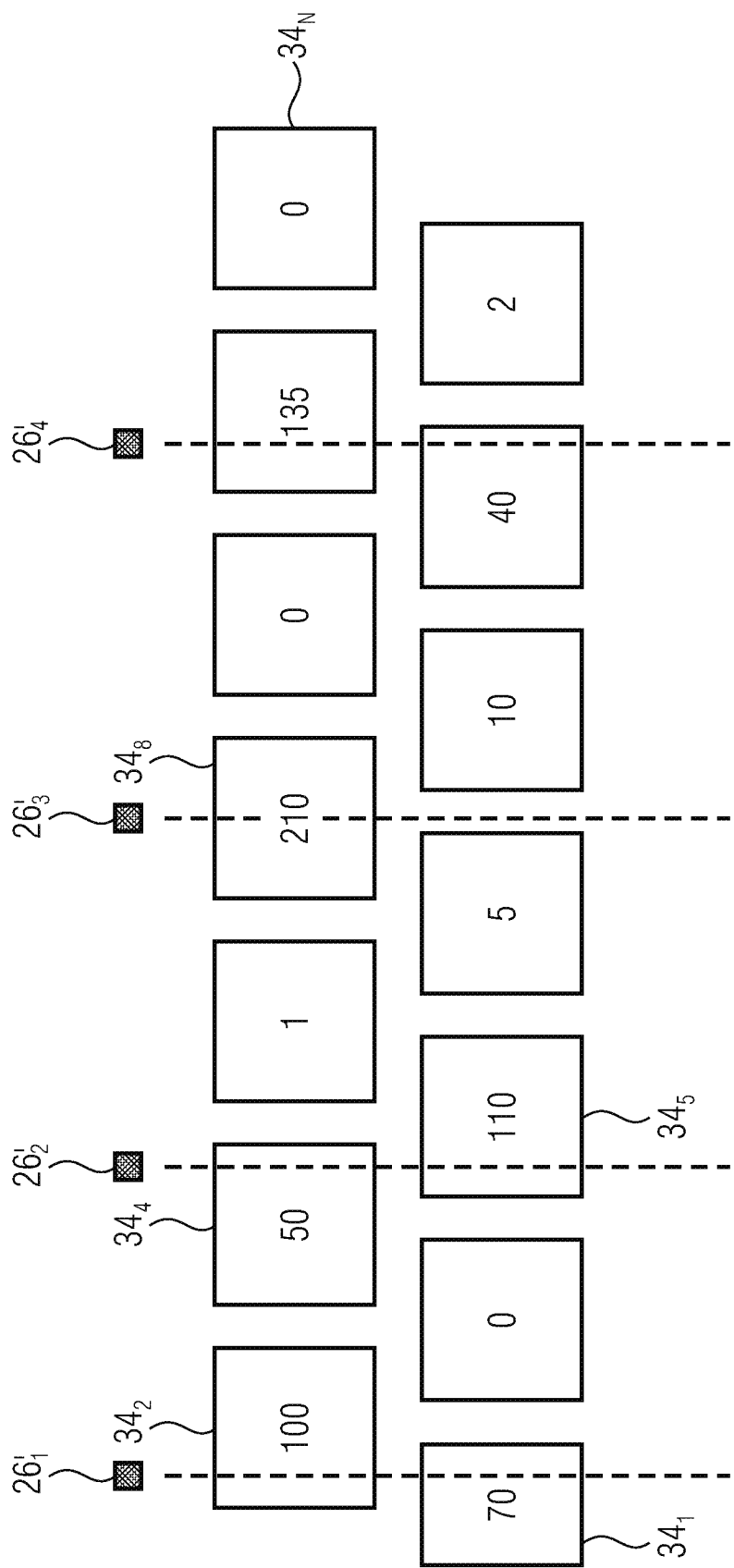
FIG. 9 shows, as compared to FIG. 8, a schematic representation of detector pixels in accordance with an embodiment which have been evaluated in accordance with the invention.

FIG. 9, in contrast, shows an inventive evaluation of detector pixels $34_1$ to $34_n$. Even though the detector pixels 34 are shown in two rows, the example refers to a one-row arrangement, which is depicted in two rows only so as to illustrate the overlap of the response functions depicted, e. g., in FIGS. 4b, 4c, 4d, and, in particular, 6a and 6b. The dots $26'_1$ to $26'_4$ sensed, e. g., by two or more detector pixels 34 provide, in the respective detector pixels, amplitude values depicted by means of the numerical values. For example, the projected dot $26'_1$ provides a signal value of 70 in the detector pixel $34_1$, and provides a signal value of 100 in the detector pixel $34_2$; by way of example, 8-bit quantization with signal values of 0 to 255 is implemented. Any other values are possible in embodiments, e. g. 4-bit quantization, 6-bit quantization, 8-bit quantization, 12-bit quantization or any other values. By comparing the values of adjacent detector pixels, it is possible to accurately evaluate, on the basis of knowledge of the course of their response functions, the positions of the respective dots $26'_1$ to $26'_4$, even if a considerably smaller number of detector pixels are provided than is the case in the configuration of FIG. 8.

In other words, the inventive approach enables using clearly fewer pixels per dot to be sensed since the positional accuracy of the dots is determined via the relative signals of adjacent pixels rather than via the pixel positions. This works in particular because the scene is previously known and since it is known that the dots at hand are disjoint dots. Otherwise, ambiguities occur. The response functions may, should or have to be ready for this, and consequently, the system may have a shorter installation length, and/or a shorter focal length implemented may be implemented. FIG. 9 shows a similar representation as was already shown in connection with FIGS. 4a to d, 5 and 6a to b, where, e. g., circles defining a $1/e^2$ width are depicted in a 2D field, for example across the width of the response function.

The representation might also be depicted by courses of the curves of the response functions that are depicted next to one another. With reference to FIG. 8, this would result in many, very narrow and mutually separated circles, whereas the inventive implementation of FIG. 9 provides few mutually overlapping response functions, one response function in each case would be obtained per pixel drawn in. The exemplary gray-scale values may be depicted from 0 to 255 in the individual pixel as a signal value. For comparing FIGS. 8 and 9, a same dot density in the field of view is assumed. The clearly smaller pixel density and the broader response functions (larger angular expansion (in the object space) and/or areal expansion (in the image space)) enable the inventive advantages, however. The location of the dot in relation to the optical axis of the respective pixel may be determined from the signal intensity of each pixel and on the basis of the knowledge of the course of the response function. It is only for simplicity's sake that a representation of equidistant dot pattern is selected. Within this context, the number of pixels per channel may be arbitrary, in principle. The pixel groups per channel, the number of channel, and, therefore, the space requirement may be kept small or even be minimized.

In accordance with an embodiment, a method of providing a device includes providing a plurality of imaging optical channels inclined in relation to one another, each of which includes an optic and at least one detector pixel arrangement, so that the plurality of optical channels is configured to obtain an image of a dot pattern of a field of view by imaging said field of view. The method further includes providing display means comprising a multitude of display pixels arranged within a display plane, so that the display pixels are configured to display graphic information. The method is performed so that the optical channels pass through the display plane and are set up for imaging the field of view between the display pixels. The method further includes coupling evaluation means to detector pixels of the detector pixel arrangements and configuring the evaluation means such that same is set up to evaluate the dot pattern on the basis of a comparison, which causes hyper resolution, of signal intensities of different detector pixels while knowing their response functions so as to obtain an evaluation result, and to control the device at least partly on the basis of the evaluation result.

Embodiments enable flat or ultra-flat designs of an imaging unit. They may be sufficiently thin to have thicknesses of only fractions of a millimeter. This is very advantageous, in particular, for application in a smart watch or other smart devices since for this purpose, additional thicknesses or additional installation space present even larger problems than in a conventional smartphone, for example, but can be avoided in both. The embodiments may be produced at low cost by production at the wafer scale. Embodiments enable adapting the array optic to the imaging task, in particular positioning of projected light dots disjoint from one another, and enable further shortening of the installation length as compared to an array optic, which would have to discriminate the dot pattern in a conventional manner.

In the following, additional embodiments and aspects of the invention will be described which can be used individually or in combination with any of the features and functionalities and details described herein.

According to a first aspect, a device comprises: a plurality of imaging optical channels 12 inclined in relation to one another, each of which includes an optic 14 and at least one detector pixel arrangement 16; the plurality of optical channels 12 being configured to obtain an image of a dot pattern 24 of a field of view 22 by imaging said field of view 22; display means 28 comprising a multitude of display pixels 34 arranged within a display plane 32, the display pixels 34 being configured to display graphic information; wherein the optical channels 12 pass through the display plane 32 and are set up for imaging the field of view 22 between the display pixels 34; evaluation means 36 coupled to detector pixels 18 of the detector pixel arrangements 16 and configured to evaluate the dot pattern 24 on the basis of a comparison, which causes hyper resolution, of signal intensities of different detector pixels 18 so as to obtain an evaluation result, and to control the device at least partly on the basis of the evaluation result.

According to a second aspect when referring back to the first aspect, the device comprises a projector configured to emit the dot pattern 24.

According to a third aspect when referring back to the second aspect, the projector is configured to emit the dot pattern 24 with an infrared spectrum; wherein the optical channels 12 are adapted to the infrared spectrum and/or selectively sense the infrared spectrum.

According to a fourth aspect when referring back to any one of the second to third aspects, the projector is configured to emit the dot pattern 24 as a pattern that is non-periodic or pseudo-random at least in portions.

According to a fifth aspect when referring back to any one of the second to fourth aspects, the projector is configured to emit the dot pattern 24 with at least 5,000 dots 26.

According to a sixth aspect when referring back to any one of the second to fifth aspects, the projector and the arrangement of the optical channels 12 are matched to each other such as to emit and capture the dot pattern, at a reference distance 56 of the field of view 22 from the device, such that each detector pixel 18 senses, on average, at the most one dot 26 of the dot pattern 24 at a time.

According to a seventh aspect when referring back to any one of the second to sixth aspects, the projector includes an array of surface emitters and an optic 14 including a diffractive element.

According to an eighth aspect when referring back to any one of the previous aspects, the evaluation means 36 is configured to obtain the evaluation result on the basis of a comparison of the image to a reference pattern.

According to a ninth aspect when referring back to any one of the previous aspects, the evaluation means 36 is configured to perform the comparison of signal intensities of different detector pixels 18 so as to determine positions of dots 26' of the dot pattern 24 that are more precise than would be achieved by sampling the total field of view 22 by means of the detector pixels 18.

According to a tenth aspect when referring back to any one of the previous aspects, the evaluation means 36 is configured to determine positions of dots in the image on the basis of an evaluation of a light intensity with which the same dot of the dot pattern is projected onto adjacent detector pixels 18 and while taking into account a response function of the detector pixels 18.

According to an eleventh aspect when referring back to any one of the previous aspects, the evaluation means 36 is configured to determine a distortion in the dot pattern 24 and to produce a depth map of the field of view 22 on the basis of the distortion, and to obtain the evaluation result on the basis of the depth map.

According to a twelfth aspect when referring back to any one of the previous aspects, the device is configured to determine, on the basis of the evaluation result, a usage authorization of a user located at least partly within the field of view 22, and to control the device in compliance with the usage authorization.

According to a thirteenth aspect when referring back to any one of the previous aspects, micro lenses of the optics 14 of the optical channels 12 and the display pixels 34 are arranged within a common plane area.

According to a fourteenth aspect when referring back to any one of the previous aspects, the optics 14 are arranged between adjacent display pixels 34.

According to a fifteenth aspect when referring back to any one of the previous aspects, the optical channels 12 are arranged in a first two-dimensional arrangement, and the display pixels 34 are arranged in a second two-dimensional arrangement.

According to a sixteenth aspect when referring back to any one of the previous aspects, the evaluation means 36 is set up for evaluating structured light or for active-stereo evaluation.

According to a seventeenth aspect when referring back to any one of the previous aspects, at least one detector pixel arrangement 16 comprises a plurality of detector pixels 18, and sensing areas of the plurality of detector pixels 18 overlap to an extent of at least 50%.

According to an eighteenth aspect when referring back to any one of the previous aspects, the detector pixel arrangement 16 is arranged within an image plane of the optics 14.

According to a nineteenth aspect when referring back to any one of the previous aspects, the evaluation means 36 is configured to evaluate the field of view 22 by means of a plurality of detector pixels 18 per optical channel 12 and, subsequently, with regard to several optical channels 12.

According to a twentieth aspect when referring back to any one of the previous aspects, the focal lengths of the optical channels 12 amount to less than 1 mm.

According to a twenty-first aspect when referring back to any one of the previous aspects, an optic 14 including a lens or a stack of lenses is formed.

According to a twenty-second aspect when referring back to any one of the previous aspects, the micro lenses of different optical channels exhibit channel-specific optical properties.

According to a twenty-third aspect when referring back to the twenty-second aspect, the micro lenses are formed, in a channel-specific manner, such that in an inclined line of vision associated with the respective optical channel 12, focused projecting of the field of view 22 onto the detector pixel arrangement 16 is obtained.

According to a twenty-fourth aspect when referring back to any one of the previous aspects, the device comprises at least one aperture structure arranged between the detector pixel arrangements 16 and a plane of the optics 14; so as to provide stray-light suppression of adjacent optical channels.

According to a twenty-fifth aspect when referring back to any one of the previous aspects, the device comprises at least one stray-light suppressing structure 46 arranged between adjacent detector pixel arrangements 16 and between a plane thereof and the plane of the optics 14; so as to provide stray-light suppression of adjacent optical channels.

According to a twenty-sixth aspect when referring back to any one of the previous aspects, the device comprises at least one stray-light suppressing structure 78 arranged between adjacent detector pixel arrangements 16 and setting a distance 76 between the detector pixel arrangement 16 and at least parts of the optics 14.

According to a twenty-seventh aspect when referring back to the twenty-sixth aspect, the optics 14 of different optical channels are connected to one another via a shared substrate, and the stray-light suppressing structure 78 is connected to the substrate.

According to a twenty-eighth aspect when referring back to any one of the previous aspects, the device is set up for facial recognition of a user, in particular depth-map based facial recognition.

According to a twenty-ninth aspect when referring back to any one of the previous aspects, the device is formed as a smart watch.

A thirtieth aspect relates to a method of providing a device, comprising: providing a plurality of imaging optical channels 12 inclined in relation to one another, each of which includes an optic 14 and at least one detector pixel arrangement 16; so that the plurality of optical channels 12 is configured to obtain an image of a dot pattern 24 of a field of view 22 by imaging said field of view 22; providing display means 28 comprising a multitude of display pixels 34 arranged within a display plane 32, so that the display pixels 34 are configured to display graphic information; so that the optical channels 12 pass through the display plane 32 and are set up for imaging the field of view 22 between the display pixels 34; coupling evaluation means 36 to detector pixels 18 of the detector pixel arrangements 16 and configuring the evaluation means 36 such that same is set up to evaluate the dot pattern 24 on the basis of a comparison, which causes hyper resolution, of signal intensities of different detector pixels 18 so as to obtain an evaluation result, and to control the device at least partly on the basis of the evaluation result.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Device for capturing a projected dot pattern in a display unit comprising:
   a plurality of imaging optical channels inclined in relation to one another, each of which comprises an optic and at least one detector pixel arrangement; the plurality of optical channels being configured to acquire an image of a dot pattern of a field of view by imaging said field of view;
   display unit comprising a multitude of display pixels arranged within a display plane, the display pixels being configured to display graphic information;
   wherein the optical channels pass through the display plane and are set up for imaging the field of view between the display pixels;
   evaluator coupled to detector pixels of the detector pixel arrangements and configured to evaluate the dot pattern on the basis of a comparison, which causes hyper resolution, of signal intensities of different detector pixels so as to acquire an evaluation result, and to control the device at least partly on the basis of the evaluation result.

2. Device as claimed in claim 1, wherein the optical channels are implemented as imaging means, and the display pixels have a planar arrangement arranged in intermediate areas of the optical channels or on the lenses of the optical channels.

3. Device as claimed in claim 1, comprising a projector configured to emit the dot pattern.

4. Device as claimed in claim 3, wherein the projector is configured to emit the dot pattern with an infrared spectrum; wherein the optical channels are adapted to the infrared spectrum and/or selectively sense the infrared spectrum.

5. Device as claimed in claim 3, wherein the projector is configured to emit the dot pattern as a pattern that is non-periodic or pseudo-random at least in portions.

6. Device as claimed in claim 3, wherein the projector and the arrangement of the optical channels are matched to each other such as to emit and capture the dot pattern, at a reference distance of the field of view from the device, such that each detector pixel senses, on average, at the most one dot of the dot pattern at a time.

7. Device as claimed in claim 1, wherein the evaluator is configured to perform the comparison of signal intensities of different detector pixels so as to determine positions of dots of the dot pattern that are more precise than would be achieved by sampling the total field of view by means of the detector pixels.

8. Device as claimed in claim 1, wherein the evaluator is configured to determine positions of dots in the image on the basis of an evaluation of a light intensity with which the same dot of the dot pattern is projected onto adjacent detector pixels and while taking into account a response function of the detector pixels.

9. Device as claimed in claim 1, wherein the evaluator is configured to determine a distortion in the dot pattern and to produce a depth map of the field of view on the basis of the distortion, and to acquire the evaluation result on the basis of the depth map.

10. Device as claimed in claim 1, wherein micro lenses of the optics of the optical channels and the display pixels are arranged within a common plane area, or wherein the optics are arranged between adjacent display pixels.

11. Device as claimed in claim 1, wherein the evaluator is set up for evaluating structured light or for active-stereo evaluation.

12. Device as claimed in claim 1, wherein at least one detector pixel arrangement comprises a plurality of detector pixels, and sensing areas of the plurality of detector pixels overlap to an extent of at least 50%.

13. Device as claimed in claim 1, wherein the evaluator is configured to evaluate the field of view by means of a plurality of detector pixels per optical channel and, subsequently, with regard to several optical channels.

14. Device as claimed in claim 1, wherein the micro lenses of different optical channels exhibit channel-specific optical properties.

15. Device as claimed in claim 14, wherein the micro lenses are formed, in a channel-specific manner, such that in an inclined line of vision associated with the respective optical channel, focused projecting of the field of view onto the detector pixel arrangement is acquired.

16. Device as claimed in claim 1, comprising at least one aperture structure arranged between the detector pixel arrangements and a plane of the optics; so as to provide stray-light suppression of adjacent optical channels.

17. Device as claimed in claim 1, comprising at least one stray-light suppressing structure arranged between adjacent detector pixel arrangements;
wherein the stray-light suppressing structure is arranged between a plane thereof and the plane of the optics; so as to provide stray-light suppression of adjacent optical channels; or
wherein the stray-light suppressing structure is arranged between adjacent detector pixel arrangements and sets a distance between the detector pixel arrangement and at least parts of the optics.

18. Device as claimed in claim 17, wherein the stray-light suppressing structure is arranged between adjacent detector pixel arrangements and sets a distance between the detector pixel arrangement and at least parts of the optics; wherein the optics of different optical channels are connected to one another via a shared substrate, and the stray-light suppressing structure is connected to the substrate.

19. Device as claimed in claim 1, which is set up for facial recognition of a user, in particular depth-map based facial recognition.

20. Method of providing a device for capturing a projected dot pattern in a display device, comprising:
providing a plurality of imaging optical channels inclined in relation to one another, each of which comprises an optic and at least one detector pixel arrangement; so that the plurality of optical channels is configured to acquire an image of a dot pattern of a field of view by imaging said field of view;
providing a display unit comprising a multitude of display pixels arranged within a display plane, so that the display pixels are configured to display graphic information;
so that the optical channels pass through the display plane and are set up for imaging the field of view between the display pixels;
coupling evaluator to detector pixels of the detector pixel arrangements and configuring the evaluator such that same is set up to evaluate the dot pattern on the basis of a comparison, which causes hyper resolution, of signal intensities of different detector pixels so as to acquire an evaluation result, and to control the device at least partly on the basis of the evaluation result.

* * * * *